(12) United States Patent
Kloetzer et al.

(10) Patent No.: US 10,731,492 B2
(45) Date of Patent: Aug. 4, 2020

(54) COMPONENT JOINT

(71) Applicant: MTU Aero Engines AG, Munich (DE)

(72) Inventors: Alexander Kloetzer, Fuerstenfeldbruck (DE); Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 539 days.

(21) Appl. No.: 15/373,130

(22) Filed: Dec. 8, 2016

(65) Prior Publication Data

US 2017/0167282 A1    Jun. 15, 2017

(30) Foreign Application Priority Data

Dec. 15, 2015 (EP) .................................. 15199978

(51) Int. Cl.
*F01D 11/00* (2006.01)
*F01D 25/24* (2006.01)
*F16B 37/12* (2006.01)
*F16B 33/00* (2006.01)
*F04D 29/08* (2006.01)
(Continued)

(52) U.S. Cl.
CPC .......... *F01D 11/003* (2013.01); *F01D 11/005* (2013.01); *F01D 25/243* (2013.01); *F01D 25/28* (2013.01); *F02C 7/28* (2013.01); *F04D 29/083* (2013.01); *F16B 33/004* (2013.01); *F16B 37/122* (2013.01); *F05D 2220/323* (2013.01); *F05D 2230/60* (2013.01); *F05D 2240/55* (2013.01); *F05D 2240/57* (2013.01)

(58) Field of Classification Search
CPC .... F01D 11/003; F01D 11/005; F01D 25/243; F01D 25/28; F02C 7/083; F02C 7/28; F16B 33/004; F16B 37/122; F05D 2240/57; F05D 2240/91; F05D 2220/323; F05D 2230/60; F05D 2240/55; F04D 29/083
See application file for complete search history.

(56) References Cited

U.S. PATENT DOCUMENTS 4,309,145 A * 1/1982 Viola .................... F01D 11/025
                                                       415/173.7
4,405,137 A * 9/1983 Webb ...................... F16J 15/34
                                                       277/553
(Continued)

FOREIGN PATENT DOCUMENTS

EP       1340885        9/2003
WO    WO2011/088819     7/2011
WO    WO2014/149350     9/2014

*Primary Examiner* — David E Sosnowski
*Assistant Examiner* — Eric J Zamora Alvarez
(74) *Attorney, Agent, or Firm* — Davidson, Davidson & Kappel, LLC

(57) ABSTRACT

A component joint including a turbomachine component (10) having at least one component flange (11); a mating turbomachine component (20) connected thereto and having at least one mating component flange (21); and at least one seal (30) to provide a seal against an overpressure (p2–p1) on the component side, the at least one seal (30) having a sealing surface (31) that engages into a groove (12) of the turbomachine component (10), the groove (12) being disposed on a mating-component-flange-facing side of the component flange (11) and having a contact surface (13) for sealingly axially supporting the sealing surface (31).

22 Claims, 2 Drawing Sheets

(51) Int. Cl.
*F02C 7/28* (2006.01)
*F01D 25/28* (2006.01)

(56) References Cited

U.S. PATENT DOCUMENTS

| | | | |
|---|---|---|---|
| 5,118,120 A * | 6/1992 | Drerup | F16J 15/021 |
| | | | 277/628 |
| 6,347,508 B1 * | 2/2002 | Smallwood | F01D 9/023 |
| | | | 60/796 |
| 6,464,457 B1 | 10/2002 | Morgan et al. | |
| 6,612,809 B2 * | 9/2003 | Czachor | F01D 11/005 |
| | | | 415/189 |
| 6,652,229 B2 | 11/2003 | Lu | |
| 6,672,833 B2 * | 1/2004 | MacLean | F23R 3/50 |
| | | | 415/116 |
| 7,040,098 B2 * | 5/2006 | Lepretre | F01D 11/005 |
| | | | 415/214.1 |
| 7,527,469 B2 * | 5/2009 | Zborovsky | F01D 9/041 |
| | | | 277/412 |
| 7,780,174 B2 * | 8/2010 | Wunderlich | F01D 9/023 |
| | | | 277/632 |
| 8,100,644 B2 * | 1/2012 | Hazevis | F01D 11/005 |
| | | | 415/173.1 |
| 9,028,188 B2 * | 5/2015 | Muskat | F16B 19/06 |
| | | | 411/501 |
| 9,062,701 B2 | 6/2015 | Hyatt | |
| 10,190,430 B2 * | 1/2019 | Leglaye | F01D 9/023 |
| 2009/0169369 A1 | 7/2009 | Morgan et al. | |
| 2015/0089957 A1 * | 4/2015 | Schwartz | F02C 7/20 |
| | | | 60/796 |

* cited by examiner

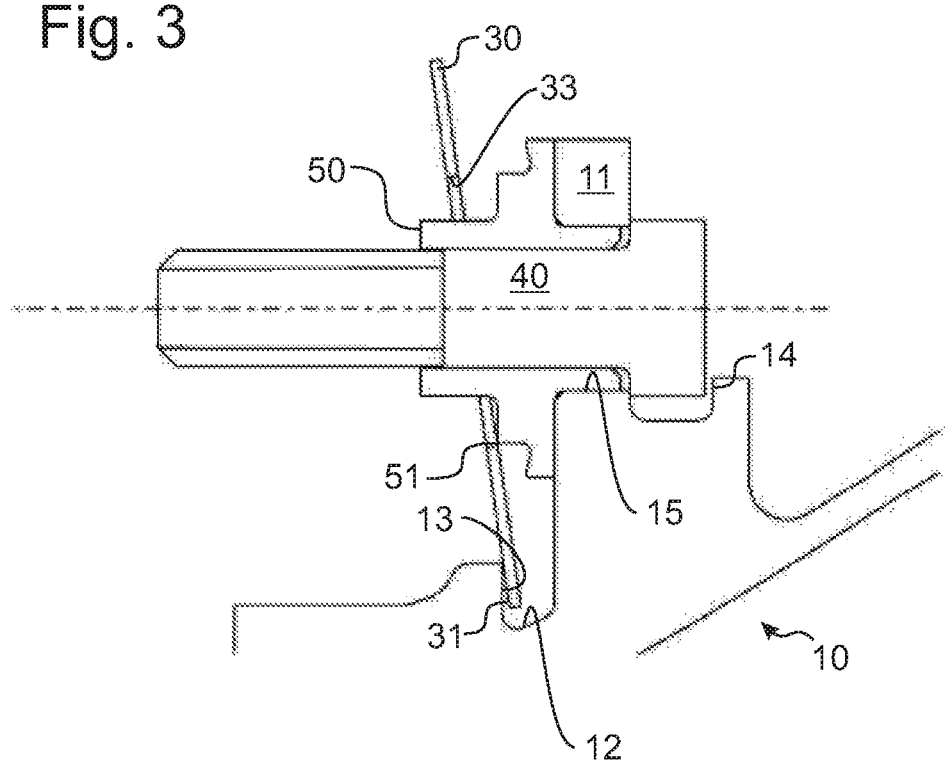

COMPONENT JOINT

This claims the benefit of European Patent Application EP15199978.6, filed on Dec. 15, 2015 and hereby incorporated by reference herein.

The present invention relates to a component joint including a turbomachine component and a mating turbomachine component connected thereto, as well as to a method for assembling the component joint.

BACKGROUND

It is known from in-house practice to seal joints between turbomachine components. In particular, in the case of gas turbines, it is known from in-house practice to use sealing plates that resist the sometimes very high temperatures.

SUMMARY OF THE INVENTION

It is an object of an embodiment of the present invention to improve a component joint and the assembly thereof.

In an embodiment of the present invention, a component joint includes a first component for a turbomachine, in particular a first component of a turbomachine, which is hereinafter referred to as a, or the, turbomachine component, or in short component, for purposes of differentiation and without limiting generality.

In an embodiment, the turbomachine component may in particular be a component for a gas turbine, in particular a compressor or turbine stage and/or a casing and/or an aircraft engine, in particular a component of a gas turbine, in particular of a compressor or turbine stage and/or of a casing and/or of an aircraft engine.

A seal according to an embodiment of the present invention can be advantageous in particular for such components, particularly for purposes of guiding cooling air, recirculated compressor air or the like.

In an embodiment of the present invention, the turbomachine component includes one or more component flanges which, in particular, are arranged adjacent one another and/or spaced from one another, in particular in a circumferential direction about a (main) machine axis of the turbomachine.

In an embodiment of the present invention, the component joint includes a second component for, or of, the turbomachine, which is hereinafter referred to as a, or the, mating turbomachine component, or in short mating component, for purposes of differentiation and without limiting generality.

In an embodiment of the present invention, this mating component is connected to the turbomachine component, in particular non-destructively detachably, in particular threadedly, and has one or more flanges which, in particular, are arranged adjacent one another and/or spaced from one another, in particular in the circumferential direction about the (main) machine axis of the turbomachine and which are hereinafter referred to as mating component flange(s) for purposes of differentiation and without limiting generality. In an embodiment, one or more component flanges are (each) connected to one or more mating component flanges, in particular non-destructively detachably, in particular threadedly.

In an embodiment of the present invention, the component joint includes one or more sealing means to provide a seal against an overpressure on the component side, the one or more sealing means (each) having a sealing surface that engages, in particular radially, into a groove of the component, in particular the same and/or radial groove that is disposed on a mating-component-flange-facing side of the corresponding component flange which, in particular, axially opposes the (respective) sealing means, the groove having a contact surface for sealingly axially supporting the sealing surface.

In an embodiment, this advantageously allows the one or more sealing means to be installed from the mating-component-flange-facing side of the component flange(s), which, in particular, can facilitate assembly.

The phrase "overpressure on the component side" is understood herein to refer in particular to an overpressure on the side of the sealing means that faces the component flange and faces away from the mating component flange.

The contact surface may in particular be a flank or wall of the groove, in particular one which is closer to the mating component.

In an embodiment, the term "axial," as used herein, refers to a direction perpendicular to the sealing and contact surfaces, and accordingly the term "radial" refers to a direction parallel to the sealing and contact surfaces. Additionally or alternatively, in an embodiment, the term "axial," as used herein, refers to a direction of a (longitudinal) axis of a bolt extending through an opening in the sealing means and connecting the component (flange) and the mating component (flange), and accordingly the term "radial" refers to a direction perpendicular thereto. Thus, in an embodiment, the sealing and contact surfaces may in particular be at least substantially perpendicular to the (longitudinal) axis of a bolt connecting the component (flange) and the mating component (flange). In an embodiment, the terms "axial" and "radial" may in particular (also) refer to a (main) machine axis of the turbomachine.

In an embodiment, the term "to sealingly axially support/bear against" is understood to refer to an at least substantially fluid-tight, in particular air-tight, contact between the sealing surface and the contact surface, the sealing surface bearing axially form-fittingly against the contact surface under the overpressure on the component side, thereby providing a seal against the overpressure on the component side. Accordingly, in an embodiment, sealing and contact surfaces are provided and adapted for sealingly axially supporting an, or the, overpressure on the component side.

In an embodiment, the component flange(s) and mating component flange(s) are connected together non-destructively detachably or destructively detachably, in particular threadedly, by one or more bolts, which (each) extend through an opening, in particular through-hole, in the sealing means or one or more of the sealing means. In particular, at least one bolt may extend through a (respective) opening of precisely one or multiple sealing means.

In an embodiment, this advantageously allows the one or more sealing means to be secured during or by the connection of the component flange and the mating component flange.

In a refinement, at least one bolt may be formed integrally with the respective component (flange) or mating component (flange) or may be non-destructively or destructively detachably connected thereto. In particular, the bolt may be a stud bolt threadedly connected to the component (flange) or mating component (flange).

In an embodiment, the bolt extends through a sleeve which in turns extends through the opening, in particular through-hole, in the sealing means or one or more of the sealing means. In a refinement, the sleeve may in particular frictionally extend into an opening, in particular through-hole, in the component flange and/or or mating component flange. In a refinement, the bolt extending through the sleeve is axially secured by a stop fixed relative to the component flange and/or is centered by the sleeve.

In an embodiment, a nut is threadedly connected to the bolt, in particular on a side of the mating component flange that faces away from the component flange.

In an embodiment, this can in particular facilitate assembly in each case.

In an embodiment, the, or one or more of the, sealing means (each) have one or more openings, in particular through-holes, which are (each) secured radially, in particular centered, on a shoulder which is fixed relative to the component, in particular relative to the component flange, and which in particular extends through the (respective) opening.

In a refinement, the shoulder fixed relative to the component (flange) may be formed integrally with the component, in particular component flange, or be non-destructively detachably or destructively detachably connected thereto. In a refinement, the shoulder may in particular be formed on the sleeve which extends through the opening in the sealing means.

In an embodiment, this can in particular facilitate assembly, and in particular make it possible to secure the sealing means during assembly.

In an embodiment, a radial height of a, or the, sealing element portion extending into the groove, in particular a radial height of the sealing surface extending into the groove, is at least equal to a radial height of the shoulder fixed relative to the component, in particular greater than a radial height of the shoulder fixed relative to the component.

A "radial height of a, or the, sealing element portion extending into the groove," in particular a "radial height of the sealing surface extending into the groove" is understood to refer in particular to the maximum or minimum overlap between the sealing element or sealing surface and the groove, in particular the contact surface. A "radial height of the shoulder fixed relative to the component" is understood to refer in particular to a radial offset toward the groove by which the sealing element must be displaced toward the groove during placement onto the shoulder; i.e., by which the sealing element is positively or forcibly displaced when inserting the sealing surface into the groove. In other words, a "radial height of the shoulder fixed relative to the component" is understood to refer in particular to a radial offset away from the groove by which the sealing element must be displaced radially away from the groove when removing it from the shoulder. If, in a refinement, the shoulder is stepped (formed with a step), then, accordingly, the radial height of the shoulder fixed relative to the component may in particular be the radial step height toward the groove onto the shoulder.

In an embodiment, this can in particular facilitate assembly, and in particular make it possible to secure the sealing means during assembly.

In an embodiment, the sealing means is disposed axially between the component flange(s) and mating component flange(s) with or without axial play and/or with or without radial play, in particular on the shoulder(s) fixed relative to the component, in particular on the shoulder(s) of the sleeve(s). Accordingly, in an embodiment, the sealing means is fixed and radially (positively) secured, with or without radial play, on the shoulder fixed relative to the component. For the sake of tightness, it is always advantageous to keep the radial play to a minimum. However, due to the necessary tolerances and different thermal expansions of the parts during operation of the turbomachine it is not possible to do without any play at all.

In an embodiment, an arrangement with play advantageously makes it possible to compensate for assembly tolerances and/or manufacturing tolerances and/or different deformations, in particular of the flanges and/or sealing means. In an embodiment, an arrangement without play allows the sealing means to be fixed in a desired position.

In an embodiment, the one or more sealing means (each) have a mating sealing surface for sealingly axially bearing against a mating contact surface of the mating component.

Accordingly, in an embodiment, the mating sealing surface bears axially form-fittingly against the mating contact surface under the overpressure on the component side, thereby providing a seal against the overpressure on the component side; i.e., the mating sealing and contact surfaces are provided and adapted for sealingly axially supporting an, or the, overpressure on the component side. In an embodiment, the sealing and mating sealing surfaces are disposed on opposite sides of the opening(s), in particular through-holes, of the (respective) sealing means, through which the bolt(s) extend(s).

In an embodiment, this makes it possible to achieve an advantageous a seal, in particular an air seal.

In an embodiment, the, or one or more of the, sealing means contain metal. In a refinement, the, or one or more of the, sealing means may be made of metal. In an embodiment, this enables the seal to withstand also elevated temperatures, in particular the temperatures that occur in compressors or turbines of gas turbines, in particular aircraft engines.

In an embodiment, the, or one or more of the, sealing means are plate-shaped or configured as sealing plates. A sealing plate may in particular have an (axial) wall thickness which is at least 10% of an extent of the sealing plate in two directions perpendicular to the wall thickness and perpendicular to each other and/or at least 0.1 mm and/or no greater than 1 mm.

In an embodiment, this makes it possible to achieve an advantageous a seal.

In an embodiment, the, or one or more of the, sealing means are straight or curved, in particular annular segment-shaped.

In an embodiment, at least two adjacent sealing means overlap each other. Alternatively or additionally, a further sealing means may be disposed axially in front of or behind two circumferentially adjacent sealing means, and in such a way that the further sealing means covers the gap between the two circumferentially adjacent sealing means.

In an embodiment, this can in particular facilitate assembly. In this connection, an overlapping edge of a sealing means may in particular be (axially) bent at right angles or stepped, so that this sealing means may sealingly bear against the contact and mating contact surfaces, on the one hand, and against the adjacent sealing means on the other hand.

In an embodiment, the sealing surface(s) of the one or more sealing means (each) sealingly axially bear against the contact surface under the overpressure on the component side, or are provided and adapted for this purpose. In a refinement, the mating sealing surface(s) of the one or more sealing means (each) sealingly axially bear against the mating contact surface under the overpressure on the component side, or are provided and adapted for this purpose.

In accordance with an embodiment of the present invention, a method for assembling a component joint as described herein includes the steps of:

inserting the sealing surface of the one or more sealing means into the (respective, in particular the same) groove of the component; and connecting the component flange(s) to the mating component flange(s).

In an embodiment, a sealing means is (in each case) slid onto the shoulder(s) and/or bolt(s) and/or sleeve(s), while at the same time introducing its sealing surface radially into the groove, in particular with the sealing means being tilted. In a refinement, the sealing means and the component, in particular its groove, and the shoulder fixed relative to the component are configured, in particular dimensioned, in such a way such that the sealing surface can only be introduced or inserted into the groove when the sealing means is tilted toward the axial direction and that the sealing means can be (re-)positioned perpendicular to the axial direction, in particular radially secured on the shoulder fixed relative to the component, (only) when (or not until) the sealing surface has been introduced into the groove.

In an embodiment, the mating component flange(s) is/are slid onto the bolts and threadedly secured by a nut or nuts.

BRIEF DESCRIPTION OF THE DRAWINGS

Further advantageous embodiments of the present invention will become apparent from the dependent claims and the following description of preferred embodiments. To this end, the drawings show, partly in schematic form, in:

FIG. 3: a step of a method for assembling the component joint in accordance with an embodiment of the present invention.

DETAILED DESCRIPTION

Figure 1:
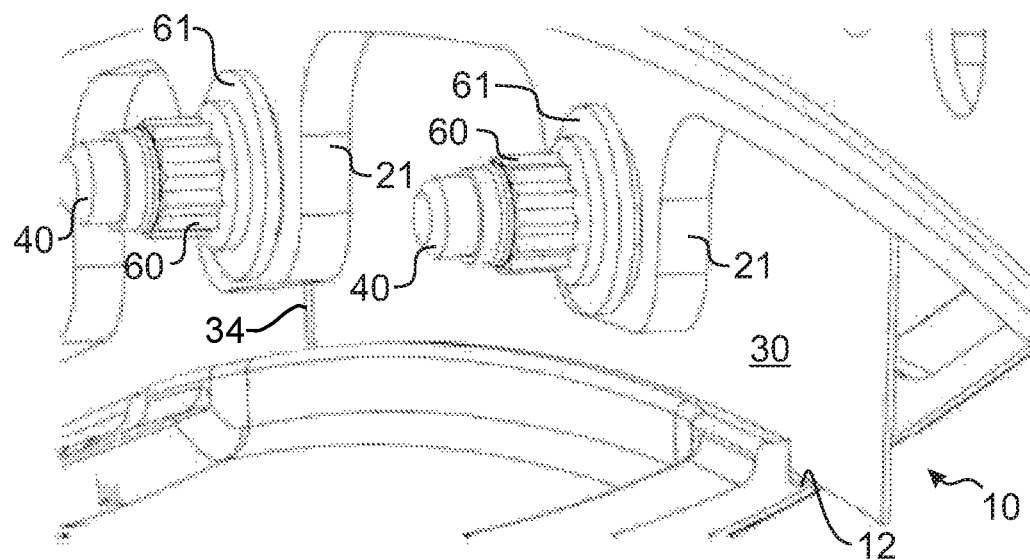
FIG. 1: a perspective view of a portion of a component joint in accordance with an embodiment of the present invention.

Referring to FIG. 3, in order to assemble the component joint (shown fully assembled in FIGS. 1, 2) in accordance with an embodiment of the present invention, initially, a sealing surface 31 of an annular segment-shaped sealing means in the form of a sealing plate 30 made of metal is inserted into a groove 12 of a turbomachine component 10 having a component flange 11, and in such a way that sealing surface 31 engages radially into groove 12 (with respect to a longitudinal bolt axis shown as a dot-dash line in FIG. 3).

Groove 12 is disposed on a mating-component-flange-facing side (left in FIGS. 2, 3) of component flange 11 and has a contact surface 13 for sealingly axially supporting sealing surface 31.

Figure 2:
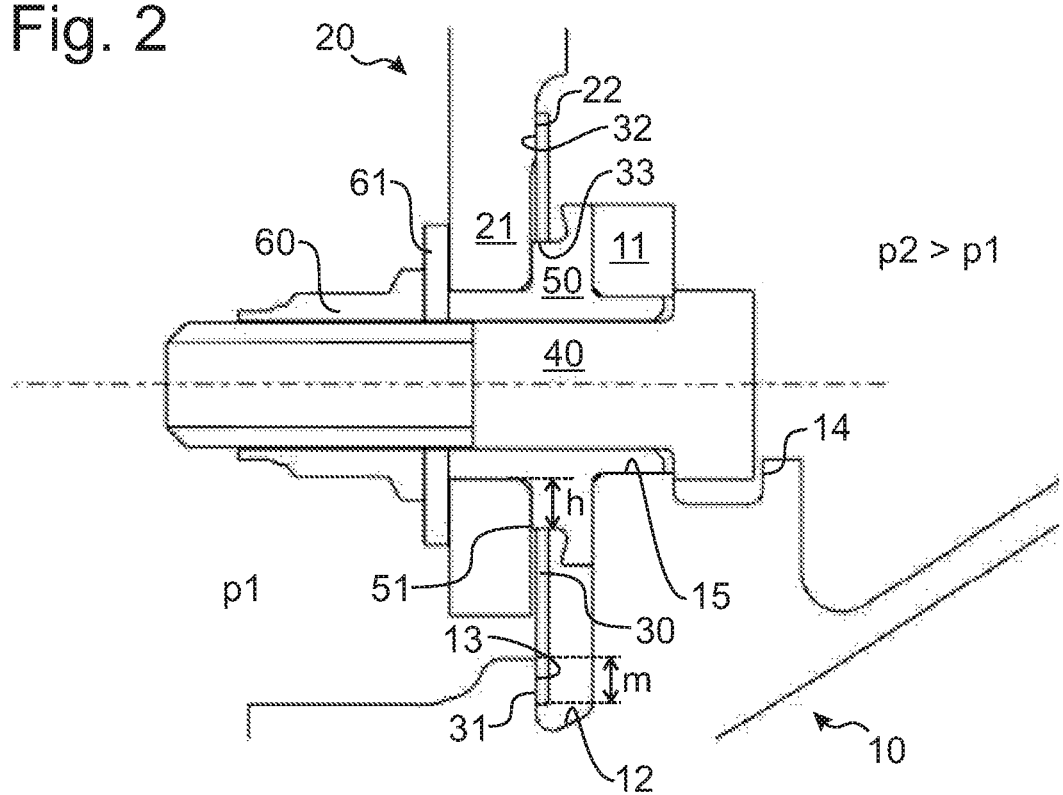
FIG. 2: an axial sectional view of the component joint.

A plurality of bolts 40, two of which are shown in FIG. 1 and one of which is shown in FIGS. 2, 3, each extend through a respective sleeve 50 and are axially secured by a shoulder 14 of turbomachine component 10 and centered by sleeve 50 in a through-hole 15 of component flange 11.

Sleeves 50 each have a shoulder 51 which, due to the attachment of sleeve 50 to component flange 11, is fixed relative to the component (flange).

When inserting sealing surface 31 into groove 12, through-holes 33 of sealing plate 30 are slid onto shoulders 51 of sleeves 50 (compare FIG. 2), so that sealing plate 30, respectively its through-holes 33, is/are radially secured on shoulders 51, which are fixed relative to the component.

Then (compare FIG. 2), mating component flanges 21 of a mating turbomachine component 20 are threadedly connected to component flange 11 by screwing nuts 60 onto bolts 40, washers 61 being placed between nuts 60 and mating component flanges 21.

In the fully assembled state shown in FIGS. 1, 2, sealing plate 30 is axially disposed with axial play between component flange 11 and mating component flanges 21 and radially secured, in particular centered, as can be seen particularly in FIG. 2.

Sealing plate 30 has a mating sealing surface 32.

During operation, an overpressure $\Delta p = p2-p1 > 0$ on the component side causes sealing plate 30 to be pressed with its sealing surface 31 against contact surface 13 and with its mating sealing surface 32 against a mating contact surface 22 on mating turbomachine component 20, so that, under the overpressure $\Delta p$ on the component side, sealing surface 31 sealingly axially bears against contact surface 13 and mating sealing surface 32 sealingly axially bears against mating contact surface 22.

It can be seen in FIG. 2 that the radial height m of the sealing surface extending into groove 12 is no greater than radial height h of the shoulder 51 fixed relative to the component.

As can be seen in FIG. 1, a gap or slot 34 extends radially between two circumferentially adjacent sealing means, i.e. seals, 30. This gap or slot may advantageously be sealed by disposing a further sealing means (not shown here) axially behind (to the right in FIG. 2) the two circumferentially adjacent sealing means 30, the further sealing means preferably resting flat against the two circumferentially adjacent sealing means 30 and being pressed thereagainst by overpressure.

Although exemplary embodiments have been described in the foregoing, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection as is derived from the claims and the combinations of features equivalent thereto.

LIST OF REFERENCE CHARACTERS 10 turbomachine component
11 component flange
12 groove
13 contact surface
14 shoulder
15 through-hole
20 mating turbomachine component
21 mating component flange
22 mating contact surface
30 sealing plate
31 sealing surface
32 mating sealing surface
33 through-hole
40 bolt
50 sleeve
51 shoulder
60 nut 61 washer
p2−p1 overpressure
m radial height of the sealing surface
h radial height of the sleeve shoulder

What is claimed is:

1. A component joint comprising:
a turbomachine component having at least one component flange;
a mating turbomachine component connected to the turbomachine component and having at least one mating component flange; and
at least one seal to provide sealing against an overpressure on a side of the turbomachine component, the at least one seal having a sealing surface engaging into a groove of the turbomachine component, the groove being disposed on a mating-component-flange-facing side of the component flange and having a contact surface for axially supporting the sealing surface; wherein the component flange and the mating component flange are connected together by at least one bolt extending through an opening in the seal to limit axial movement of the component flange away from the mating component flange, wherein the at least one bolt extends through through-holes of the component flange and the mating component flange.

2. The component joint as recited in claim 1 wherein the bolt is threaded.

3. The component joint as recited in claim 1 wherein the bolt extends through a sleeve extending through the opening in the seal.

4. The component joint as recited in claim 1 wherein the seal has at least one opening secured radially on a shoulder fixed relative to the turbomachine component.

5. The component joint as recited in claim 4 wherein a radial height of a sealing element portion extending into the groove is no greater than a radial height of the shoulder.

6. The component joint as recited in claim 1 wherein the seal is disposed axially between the at least one component flange and the at least one mating component flange.

7. The component joint as recited in claim 1 wherein the seal has a mating sealing surface for axially bearing against a mating contact surface of the mating turbomachine component.

8. The component joint as recited in claim 7 wherein the contact surface of the groove and the mating contact surface are parallel and at a same axial location.

9. The component joint as recited in claim 1 wherein the seal contains metal.

10. The component joint as recited in claim 1 wherein the seal is plate-shaped.

11. The component joint as recited in claim 1 wherein the seal is straight or curved.

12. The component joint as recited in claim 1 wherein the seal is annular segment-shaped.

13. The component joint as recited in claim 1 wherein the at least one component flange includes a plurality of spaced-apart component flanges or the at least mating component flange includes a plurality of spaced-apart mating component flanges.

14. The component joint as recited in claim 1 further comprising a further seal circumferentially adjacent to the seal and spaced by a radially extending gap.

15. The component joint as recited in claim 1 wherein the sealing surface axially bears against the contact surface under the overpressure on the side.

16. The component joint as recited in claim 1 wherein the turbomachine component is a component for a gas turbine.

17. The component joint as recited in claim 16 wherein the turbomachine component is a component for a compressor or turbine stage or a casing or an aircraft engine.

18. A turbomachine comprising the component joint as recited in claim 1.

19. A gas turbine comprising the turbomachine as recited in claim 18.

20. A method for assembling a component joint as recited in claim 1, comprising the steps of:
inserting the sealing surface of the at least one seal into the groove of the turbomachine component; and
connecting the at least one component flange to the at least one mating component flange.

21. The component joint as recited in claim 7 wherein the seal has a thickness no greater than 1 mm.

22. The component joint as recited in claim 1 further comprising a nut, the bolt being screwed into the nut, and a head of the bolt and the nut limiting the axial movement of the component flange away from the mating component flange.

* * * * *